(No Model.)
J. E. PATTISON.
APPARATUS FOR REMOVING SEDIMENT FROM TANKS.
No. 307,325. Patented Oct. 28, 1884.
FIG. I.
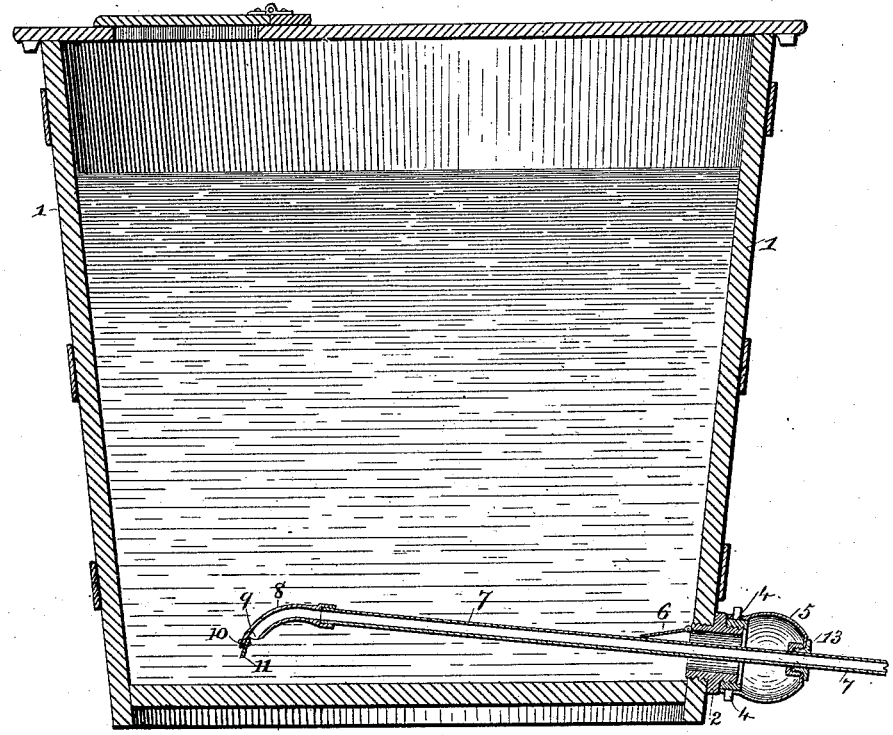
FIG. II.
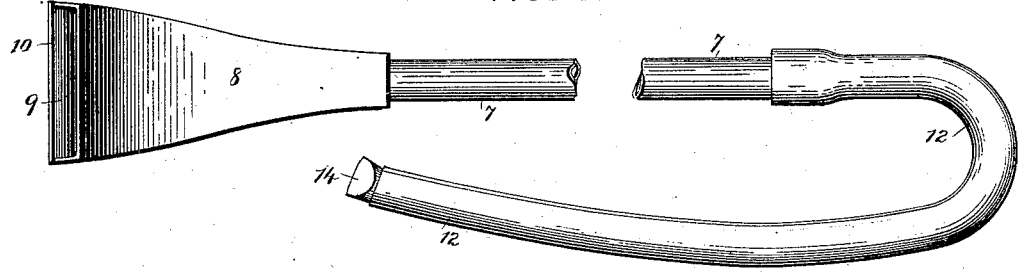
FIG. III.
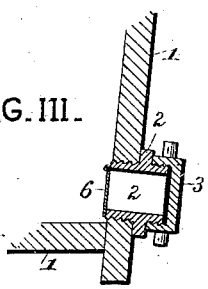
ATTEST-
Geo. T. Smallwood
Geo. L. Wheelock
INVENTOR-
John E. Pattison.
By Knight Bros.
attys.

UNITED STATES PATENT OFFICE.

JOHN E. PATTISON, OF NEW ORLEANS, LOUISIANA.

APPARATUS FOR REMOVING SEDIMENT FROM TANKS.

SPECIFICATION forming part of Letters Patent No. 307,325, dated October 28, 1884.

Application filed January 26, 1884. (No model.)

*To all whom it may concern:*

Be it known that I, JOHN E. PATTISON, a citizen of the United States, residing at New Orleans, in the parish of Orleans and State of Louisiana, have invented certain new and useful Improvements in Apparatus for Removing Sediment and other Impurities from Water-Cisterns, and Juice, Wine, and other Tanks, of which the following is a specification.

The object of the invention is to accomplish the cleansing of the bottoms of cisterns and tanks in a manner which shall be at the same time thorough and involve the slightest possible removal, waste, or disturbance of the pure contents of the cistern or tank. To this end I provide an implement capable of reaching every portion of the bottom of the receptacle, and of being so operated as to loosen the sediment so as to permit it to be forced out under the action of the superincumbent liquid in the tank.

The implement consists of a staff or manipulating-bar which is provided at one end with a hollow head open below for the admission of the sediment and liquid, and having a scraper or brush for loosening the matter to be removed from the bottom of the tank. A tube or pipe may connect this head with the outer air, or preferably the staff itself is made hollow to allow the liquid and sediment to flow therethrough. The staff is made of such length as to reach to any portion of the bottom of the tank, and projects sufficiently outside to enable it to be readily handled. A flexible tube fixed on the outer end of the hollow staff enables the conduction of the material delivered to any desired point of discharge.

The implement being as above described, the tank is prepared as follows for the application thereto of the implement: A screw-nut is fixed in the side of the tank, near its bottom, and provided within the tank with a clack-valve opening inward. To the outer side of the screw-nut is screwed either a cap for hermetically closing it or a flexible pouch or bushing which is slipped on the cleaner-staff, and through which, when applied to the side of the tank, the said cleaner is operated to remove the sediment, sufficient freedom of motion being thus allowed the staff to enable it to reach any portion of the bottom of the tank or cistern. An advantage of this construction is that it is capable of operation in cisterns having an immovable covering or being otherwise inaccessible from the top.

In order that my invention may be more fully understood, I will proceed to describe it with reference to the accompanying drawings, in which—

Figure I is a sectional view of a cistern or tank with my improved cleaner applied. Fig. II is a plan from beneath of the cleaner. Fig. III is a partial sectional view of the screw-plug with closing-cap in position.

1 may represent a cistern or tank for containing water, juice, or other liquid from which it is desirable to remove the sediment. 2 is a plug or nut having screw-threads at each side—one for affixing it to the side of the tank or cistern, near its bottom, and the other for the attachment of a cap, 3, or the metal ring 4 of a flexible bushing, 5. The inner side of the plug 2 is provided with a clack or other valve, 6, opening freely inward, and having its seat outward against the end of the plug. When forced to its seat by the pressure of the superincumbent liquid in the tank, the valve 6 will prevent or nearly prevent the escape of the liquid, even with the cap 3 removed. When the cleansing attachment is not applied, however, it is preferred to tightly close the opening through the plug by the screw-cap 3.

The cleansing implement consists of staff 7, preferably hollow, and provided on its inner end with a broad hollow head, 8, curved downwardly, and having opening 9, for the admission of sediment and liquid to the interior of the head. The outer end of the head is provided with a projecting flange, 10, to which is affixed a flexible brush or scraper, 11, preferably of rubber. The other end of the staff is made to project sufficiently from the side of the cistern or tank to serve as a handle, and to it may be applied a flexible tube, 12, to conduct the material to any desired point of discharge. When the cleaner is being employed, the cap 3 is removed and the flexible bushing 5 screwed in place. This bushing consists of a metallic ring, 4, and a pouch or gland, 5, of rubber, leather, or similar flexible material. In the middle of the gland 5 is placed the bushing proper, 13, of size to receive the staff 7 and prevent the escape of liquid around the same. In some cases it may be found practicable to do away with the bushing 13, the staff 7 in such cases working through a hole prepared therefor in the gland.

To apply the implement the cap 3 is first removed. The clack-valve then, falling down to its seat, will prevent the escape of liquid. The staff of the cleaner is inserted into its bushing, the head laid within the plug, and the bushing screwed to place. The cleaner can then be pushed into the tank, opening the valve and letting water into the pouch and against the flexible gland. The implement is then forced over to the far side of the tank without touching the bottom and then drawn slowly forward, the plug 14, until now closing the outer end of the discharge-tube, being removed. The sediment is banked up before the scraper 11, and driven up into the hollow head of the cleaner by the superincumbent mass of liquid. The opening in the plug is made of such size as will allow free movement of the cleaner and its direction toward any part of the bottom, the flexible nature of the bushing being also such as will contribute to the freedom of motion of the cleaner.

The opening in the tank may be of circular or other shape. In some cases, to enable the insertion of a broad-headed cleaner, it may be preferable to have the opening elongated horizontally.

Having thus described my invention, the following is what I claim as new therein and desire to secure by Letters Patent:

1. The implement for removing sediment and impurities from the bottoms of cisterns or tanks, consisting of a staff of length sufficient to reach every portion of the bottom of the cistern, a duct for the removal of the liquid and sediment, and a curved hollow head, open beneath to allow the material to enter, as shown and described.

2. The cleaning implement for cisterns and tanks, consisting of staff 7, having downwardly-turned hollow head 8, open beneath, as shown, and provided with a brush or scraper at its outer end, and a duct for carrying off the sediment, as set forth.

3. The cleaning implement having hollow staff, downwardly-turned hollow head, and a brush or scraper for loosening the sediment, substantially as described.

4. The combination, with a cleaning implement having a rigid staff or handle, of a cistern having an opening for the passage of said staff, so bushed as to allow universal movement of the said staff, substantially as set forth.

5. The combination, with an implement for removing sediment from the bottoms of tanks, of an aperture in the side of the tank, covered by a flexible gland provided with means for securing it around said aperture, and an opening for the passage of said staff of said cleaning implement, substantially as set forth.

6. The combination, with an implement for removing sediment from the bottoms of tanks, of a tank having a hollow screw-plug in its side, and a flexible gland having a screw-collar for securing it to said plug, and an opening for the passage of the staff of said cleaning implement.

7. In combination with a cleaning implement having a suitable discharge-tube, and a flexible bushing for said implement in the side of the tank or cistern, a plug for the outer end of discharge-tube, substantially as shown.

8. In a device for cleaning cisterns and tanks, the combination of a movable hollow head, a hollow manipulating-staff, a flexible tube connected therewith, and a stopper for controlling the flow of matter therethrough, as set forth.

9. A cistern constructed with an aperture near its bottom, an outwardly-seated valve on the inside, guarding said aperture, a chamber external to the valve, for the reception of the head of a cleaning implement, and a flexible gland or packing surrounding the staff of the cleaning implement, and secured around the outside of the chamber, as and for the purposes set forth.

JOHN E. PATTISON.

Witnesses:
H. M. HYAMS,
JAS. TYMAN.